Patented July 3, 1928.

1,675,486

UNITED STATES PATENT OFFICE.

COLIN G. FINK, OF YONKERS, NEW YORK.

FORM OF TUNGSTEN AND METHOD OF PRODUCING THE SAME.

No Drawing.   Application filed January 16, 1924.  Serial No. 686,628.

This invention relates to the production of a tough, flexible, ductile tungsten.

The object of this invention is to produce tungsten of a tough, flexible character and which may be manipulated with ease, and is not subject to sagging when used as a filament in lamps.

Other objects of the invention will be obvious and will in part appear hereinafter.

The invention accordingly comprises the several steps and the relation and order of one or more of such steps with respect to each of the others, and the article possessing the features, properties, and the relation of elements, which are exemplified in the following detailed disclosure, and the scope of the application of which will be indicated in the claims.

Heretofore tungsten has been generally regarded as a hard, brittle metal possessing little or no malleability or ductility when cold to the extent that in the process of drawing it into wire, the dies and the wire are both heated to an elevated temperature. Tungsten has heretofore been known, moreover, as possessing the undesirable quality of losing its stiffness at incandescent temperatures so that when used as a coil in a lamp there is a tendency of the coil to sag, which may reach the point of causing adjacent turns to touch causing a short circuit.

In accordance with this invention, it has been discovered that when produced in accordance with the process herein outlined, a new form of tungsten is obtained which is tough and flexible when cold, to the extent that it can be passed through a drawing die without heating. I have found, moveover, that this new wire is durable and possesses little or no tendency to sag when used in the filament even though elevated to a temperature far in excess of that ordinarily employed in incandescent lamps.

The metallurgy of tungsten has not yet reached the point where the facts are beyond question, but when tungsten rods heretofore manufactured fracture, a microscopic examination of the fracture reveals the fact that it is a cleavage between crystals while the crystals themselves remain unbroken. The series of experiments which I have performed has demonstrated that this is due to the presence of small quantities of impurities between the crystal faces, which impurities are of less tensile strength and present less adhesion to the crystal faces than the tensile strength of the crystals themselves. These impurities, moreover, are of a character such that they are not reduced in the hydrogen atmosphere in which the tungsten is treated in any adequate degree, if at all.

In accordance with this invention, these intercrystalline impurities are eliminated, and to this end there may be introduced into the process a substance capable of reducing these impurities to less objectionable form.

The nature or amount of the interfacial or intercrystalline impurities spoken of have not yet been ascertained, but in all probability it comprises an oxide or similar compound of tungsten of such a nature or character that it cannot be removed by the hydrogen in the treating bottle. These impurities may be eliminated by the addition to the tungsten slug of a substance having a high affinitive for hydrogen whereby the slug may retain its hydrogen even up to high elevated temperatures. Thus, for example, I have found that if 1.4% by weight of zirconium is added to the slug, the zirconium, probably because of the fact that it forms a hydride which is not easily dissociable at high temperatures, is capable of reacting with the intercrystalline impurities to eliminate them and that when such elimination has occurred, an entirely new and radically different form of tungsten is obtained.

I have found that the action may be very much hastened by insuring that the slug shall be in a porous condition while undergoing the treatment. A convenient way of effecting this is by the addition to the slug of a small proportion of the substance incapable of alloying with tungsten but which will preferably be completely eliminated by the subsequent treatment. A suitable material for this purpose is copper.

A practical manner of carrying out this invention therefore comprises the addition to the tungsten slug of, for example, about 1.4% by weight of zirconium and about 2 or 3% by weight of copper. When such a slug is heated in the presence of hydrogen, this entirely new form of tungsten is obtained in which the abhesion between crystals is so great that fracture occurs by a rupture of the crystal itself.

It has been found that it is advantageous to add a small proportion of hydrocarbon vapor to the hydrogen in the treating bottle, as for example, by passing the dried hydrogen through a mixture of aniline oil and pyridine, as in this way the results are attained quickly, accurately and reliably.

This new form of tungsten is radically different from that heretofore known. It is sufficiently soft to be cut by a hack saw—it is sufficiently ductile so that it may be drawn through several passes of wire dies without heating and when broken it give the characteristic fibrous structure of metals which break through the crystals. When concentrated filament lamps are made out of the wire of this invention, they have little, if any, tendency to sag even at extreme temperatures.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent, is:

1. The process of preparing tungsten bodies containing tungsten crystals in part, which comprises incorporating in a slug of tungsten material a relatively small amount of a substance having a high affinity for hydrogen at relatively elevated temperatures and capable of reacting with intercyrstalline impurities, and then heat-treating said slug in hydrogen to produce the reaction whereby the intercrystalline impurities are removed.

2. The process of preparing tungsten bodies containing tungsten crystals in part, which comprises incorporating in a slug of tungsten material, a substance containing zirconium in an amount in the neighborhood of 1.4% by weight, and then heat-treating said slug in a hydrogen atmosphere at a temperature adapted to produce a reaction whereby the introduced substance substantially removes all intercrystalline impurities.

3. The process of preparing tungsten bodies containing tungsten crystals in part, which comprises incorporating in a slug of tungsten material a substance comprising zirconium taken by weight in an amount of about 1.4% and copper taken by weight in an amount not in excess of 3%, and then heat-treating said slug in a hydrogen atmosphere at a temperature adapted to produce a reaction whereby the introduced substance substantially removes all intercrystalline impurities.

In testimony whereof I affix my signature.

COLIN G. FINK.